US009649717B2

(12) United States Patent
Ananthanarayanan

(10) Patent No.: US 9,649,717 B2
(45) Date of Patent: May 16, 2017

(54) WELDING ASSEMBLY AND METHOD

(71) Applicant: Innovative Weld Solutions Ltd., Dayton, OH (US)

(72) Inventor: Venkatasubramanian Ananthanarayanan, Beavercreek, OH (US)

(73) Assignee: Innovative Weld Solutions, Ltd., Dayton, OH (US)

( * ) Notice: Subject to any disclaimer, the term of this patent is extended or adjusted under 35 U.S.C. 154(b) by 425 days.

(21) Appl. No.: 14/140,362

(22) Filed: Dec. 24, 2013

(65) Prior Publication Data

US 2015/0174691 A1     Jun. 25, 2015

(51) Int. Cl.
*B23K 11/30* (2006.01)
*B23K 11/18* (2006.01)
*B23K 11/00* (2006.01)
*B23K 11/11* (2006.01)
*B23K 101/32* (2006.01)
*B23K 101/34* (2006.01)
*B23K 101/38* (2006.01)
*B23K 103/10* (2006.01)

(52) U.S. Cl.
CPC .......... *B23K 11/185* (2013.01); *B23K 11/004* (2013.01); *B23K 11/11* (2013.01); *B23K 11/3009* (2013.01); *B23K 2201/32* (2013.01); *B23K 2201/34* (2013.01); *B23K 2201/38* (2013.01); *B23K 2203/10* (2013.01)

(58) Field of Classification Search
CPC .......... B23K 11/00; B23K 11/16; B23K 11/30
USPC ............ 219/117.1, 119, 121.13, 124.02, 136
See application file for complete search history.

(56) References Cited

U.S. PATENT DOCUMENTS

| 3,037,108 | A | * | 5/1962 | Poillevey | ............. | B23K 11/008 |
| | | | | | | 219/107 |
| 3,706,955 | A | | 12/1972 | Bunnell | | |
| 3,842,487 | A | | 10/1974 | Hartz | | |
| 3,955,044 | A | * | 5/1976 | Hoffman | .................. | H01R 4/62 |
| | | | | | | 174/84 C |
| 4,214,142 | A | * | 7/1980 | Crosby | ............. | B23K 11/3009 |
| | | | | | | 219/119 |
| 4,229,063 | A | | 10/1980 | Yoshizawa | | |

(Continued)

FOREIGN PATENT DOCUMENTS

| EP | 2219268 | 8/2010 |
| JP | S57121886 | 7/1982 |

(Continued)

OTHER PUBLICATIONS

International Preliminary Report on Patentability, Intl. App. No. PCT/US2014/058202 (2016).

(Continued)

*Primary Examiner* — Dana Ross
*Assistant Examiner* — Ayub Maye
(74) *Attorney, Agent, or Firm* — Walters & Wasylyna LLC

(57) ABSTRACT

A welding assembly may include a current generator, a first electrode electrically coupled to the current generator, the first electrode including a first engagement surface, a second electrode electrically coupled to the current generator, the second electrode including a second engagement surface and a width-determining fixture positioned between the first electrode and the second electrode to define a welding volume.

16 Claims, 12 Drawing Sheets

(56) References Cited

U.S. PATENT DOCUMENTS

| | | | |
|---|---|---|---|
| 4,400,608 A * | 8/1983 | Wagatsuma | B23K 35/0205 219/107 |
| 4,910,376 A * | 3/1990 | Riley | B23K 35/0205 219/119 |
| 5,021,627 A * | 6/1991 | Bersch | B23K 35/0205 219/119 |
| 5,360,958 A * | 11/1994 | Bogue | B23K 11/3009 219/110 |
| 5,660,742 A * | 8/1997 | Warner | B23K 11/002 219/243 |
| 5,739,496 A * | 4/1998 | Asakura | H01R 43/0214 219/119 |
| 5,914,057 A * | 6/1999 | Nippert | B23K 11/3009 219/119 |
| 6,225,591 B1 * | 5/2001 | Nippert | B21J 9/02 219/119 |
| 6,538,203 B1 | 3/2003 | Nolle et al. | |
| 6,910,925 B2 | 6/2005 | Endo et al. | |
| 7,048,551 B2 | 5/2006 | Takayama | |
| 7,111,376 B2 * | 9/2006 | Lombardi | B25B 7/02 29/248 |
| 7,115,004 B2 | 10/2006 | Takayama | |
| 7,174,633 B2 | 2/2007 | Onuma | |
| 7,207,850 B2 | 4/2007 | Takayama | |
| 7,282,679 B2 | 10/2007 | Reichinger | |
| 7,344,421 B1 | 3/2008 | Spencer | |
| 7,374,466 B2 | 5/2008 | Onuma et al. | |
| 7,494,388 B2 | 2/2009 | Kakuta | |
| 7,597,596 B2 | 10/2009 | Watanabe | |
| 7,690,954 B2 | 4/2010 | Watanabe et al. | |
| 7,705,265 B2 | 4/2010 | Asakura et al. | |
| 7,777,133 B2 | 8/2010 | Onuma | |
| 7,803,008 B2 | 9/2010 | Onuma | |
| 7,867,014 B2 | 1/2011 | Kuwayama | |
| 7,896,715 B2 | 3/2011 | Kumakura et al. | |
| 7,905,745 B2 | 3/2011 | Watanabe et al. | |
| 7,905,755 B1 | 3/2011 | Martauz | |
| 7,954,235 B2 | 6/2011 | Martauz et al. | |
| 7,960,652 B2 | 6/2011 | Drew et al. | |
| 8,147,281 B2 | 4/2012 | Kuwayama et al. | |
| 8,181,343 B2 | 5/2012 | Martauz et al. | |
| 8,187,043 B2 | 5/2012 | Kumakura et al. | |
| 8,245,396 B2 | 8/2012 | Kondo et al. | |
| 8,266,798 B2 | 9/2012 | Martauz | |
| 8,333,624 B2 | 12/2012 | Kakuta | |
| 8,360,803 B2 | 1/2013 | Sakai | |
| 8,375,578 B2 | 2/2013 | Kumakura | |
| 8,399,763 B2 | 3/2013 | Horiike et al. | |
| 2004/0088857 A1 | 5/2004 | Fujimoto et al. | |
| 2004/0142607 A1 | 7/2004 | Asakura et al. | |
| 2004/0157504 A1 | 8/2004 | Fujimoto et al. | |
| 2006/0169742 A1 | 8/2006 | Fujimoto et al. | |
| 2006/0208838 A1 | 9/2006 | Beuscher et al. | |
| 2006/0237396 A1 * | 10/2006 | Buday | B23K 11/30 219/119 |
| 2007/0184715 A1 | 8/2007 | Onuma | |
| 2009/0235521 A1 | 9/2009 | Suzuki et al. | |
| 2009/0269970 A1 | 10/2009 | Kumakura | |
| 2009/0294411 A1 * | 12/2009 | Khakhalev | B23K 11/14 219/117.1 |
| 2009/0315419 A1 * | 12/2009 | Mita | H01R 4/20 310/71 |
| 2010/0263911 A1 | 10/2010 | Watanabe | |
| 2010/0263912 A1 | 10/2010 | Watanabe | |
| 2011/0014825 A1 | 1/2011 | Drew et al. | |
| 2011/0070771 A1 | 3/2011 | Martauz | |
| 2012/0318559 A1 | 12/2012 | Aoyagi et al. | |
| 2012/0324727 A1 | 12/2012 | Seifert et al. | |
| 2013/0040511 A1 | 2/2013 | Takashima | |
| 2013/0045610 A1 | 2/2013 | Drew et al. | |
| 2013/0095708 A1 | 4/2013 | Mitose et al. | |
| 2013/0115828 A1 | 5/2013 | Seifert et al. | |
| 2013/0115830 A1 | 5/2013 | Seifert et al. | |
| 2013/0126234 A1 | 5/2013 | One et al. | |
| 2013/0126235 A1 | 5/2013 | Tanikawa et al. | |
| 2014/0102785 A1 * | 4/2014 | Miyamoto | H01R 4/20 174/84 C |

FOREIGN PATENT DOCUMENTS

| | | |
|---|---|---|
| JP | S59197386 | 11/1984 |
| JP | 2001068244 A * | 3/2001 |
| WO | 2010012515 | 2/2010 |
| WO | 2010102845 | 9/2010 |
| WO | 2012048992 | 4/2012 |
| WO | 2012143154 | 10/2012 |

OTHER PUBLICATIONS

International Search Report and Written Opinion, PCT/US2014/058202 (2014).

* cited by examiner

WELDING ASSEMBLY AND METHOD

FIELD

The present disclosure is generally related to welding apparatus, systems and methods and, more particularly, to resistance welding assemblies for welding metal and metal alloy stranded cables or wires.

BACKGROUND

Stranded metals and metal alloys (e.g., stranded cables and wires) find a wide variety of applications. Particularly, stranded aluminum and aluminum alloys find a wide variety of applications due to their favorable combination of electrical conductivity properties and mechanical properties, including strength-to-weight ratio, low temperature (cryogenic) properties, corrosion resistance and notch toughness.

The challenge with stranded aluminum and aluminum alloys is joining (by welding) the stranded cables or wires to one another and/or to a connector. During a welding operation (e.g., resistive welding), individual strands of the cable or wire may not consistently liquefy to form a solid welded workpiece. For example, strands located proximate the periphery of the cable or wire may liquefy; while strands located proximate the center of the cable or wire may not liquefy sufficiently to form a suitably solid weld. In order to sufficiently liquefy strands proximate the center of the cable or wire, the strands located proximate the periphery of the cable or wire may tend to burn and the whole welded assembly may tend to stick to the weld electrodes.

Accordingly, those skilled in the art continue with research and development efforts in the field of welding stranded metals and metal alloys.

SUMMARY

In one embodiment, the disclosed welding assembly may include a current generator, a first electrode electrically coupled to the current generator, the first electrode including a first engagement surface, a second electrode electrically coupled to the current generator, the second electrode including a second engagement surface and a width-determining fixture positioned between the first electrode and the second electrode to define a welding volume.

In another embodiment, the disclosed welding assembly may include a workpiece positioned between the first electrode and the second electrode, wherein the width-determining fixture is positioned at least partially around the workpiece.

In another embodiment, the workpiece may include a first member, the first member including a plurality of strands, and wherein the first member is positioned between a first electrode, a second electrode and a width-determining fixture within a welding volume.

In another embodiment, the workpiece may include a second member, the second member being positioned between the first member and the second electrode, wherein the width-determining fixture engages the second member.

In another embodiment, the workpiece may include an auxiliary member, the auxiliary member is positioned at least partially around a plurality of strands of a first member.

In another embodiment, the width-determining fixture may include a pair of side stops positioned adjacent to a first electrode, wherein a linear position of each side stop of the pair of side stops is independently adjustable with respect to the first electrode.

In another embodiment, the width-determining fixture may include a second pair of side stops positioned adjacent to a second electrode, wherein a linear position of each side stop of the second pair of side stops is independently adjustable with respect to the second electrode.

In yet another embodiment, disclosed is a method for welding stranded metals or metal alloys, the method may include the steps of: (1) providing a current generator, (2) assembling a workpiece including a first member, the first member including a plurality of strands, (3) positioning a first electrode proximate the workpiece, the first electrode being electrically coupled to the current generator, (4) positioning a second electrode proximate the workpiece, the second electrode being electrically coupled to the current generator, (5) applying a clamping force to the workpiece, (6) positioning a width-determining fixture between the first electrode and the second electrode around the workpiece to define a welding volume, and (7) applying a current through the workpiece to form a solid welded workpiece.

Other embodiments of the disclosed welding assembly and method will become apparent from the following detailed description, the accompanying drawings and the appended claims.

DETAILED DESCRIPTION

Figure 1:
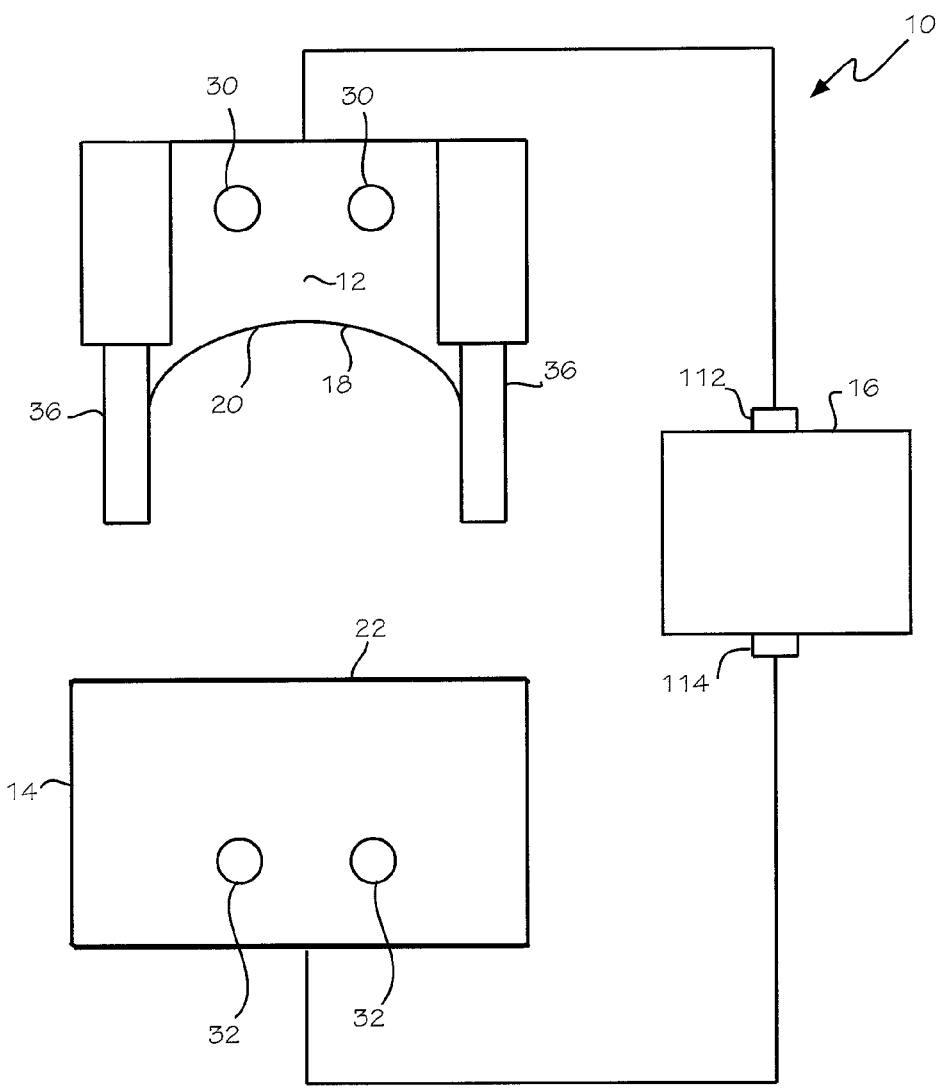
FIG. 1 is a schematic illustration of one embodiment of the disclosed welding assembly, wherein the welding assembly includes a first and second electrode and a width-determining fixture.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Figure 2:
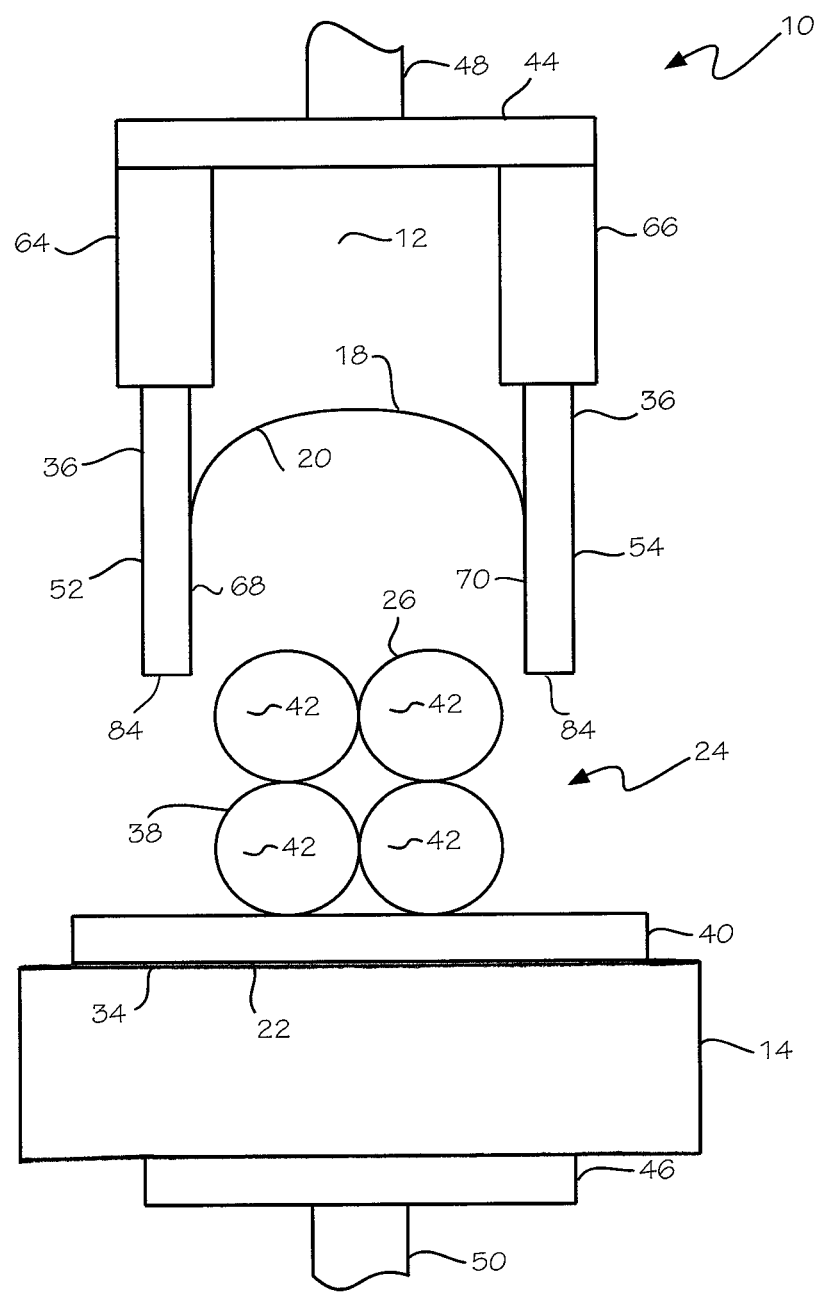
FIG. 2 is a side elevational view of another embodiment of the disclosed welding assembly and a workpiece.

Referring to FIG. 1, one embodiment of the disclosed welding assembly, generally designated 10, may include a first (e.g., upper) electrode 12, a second (e.g., lower) electrode 14 and a current generator 16. The first electrode 12 and the second electrode 14 may be located at opposite positions (e.g., in a vertical direction). The first electrode 12 may be electrically coupled to the current generator 16 and may include and a first engagement surface 18. The second electrode 14 may be electrically coupled to the current generator 16 and may include a second engagement surface 22. The first engagement surface 18 and the second engagement surface 22 may include size and shape suitable to engage (e.g., contact) at least a portion of an exterior surface of a workpiece 24 (FIG. 2). For example, the first engagement surface 18 of the first electrode 12 and the second engagement surface 22 of the second electrode 14 may be configured to solidify a plurality of metal or metal alloy strands (e.g., a metal or metal alloy stranded cable or wire) and weld the solidified strands to a metal or metal alloy connector terminal.

The current generator 16 may be any source of electrical energy capable of supplying an electric current to the first electrode 12 and the second electrode 14 to achieve resistive heating in the workpiece 24 (FIG. 2). In one embodiment, the current generator 16 may include appropriate circuitry for supplying electric current to the first electrode 12 and the second electrode 14, as well as controlling the magnitude and timing of the electric current being supplied to the first electrode 12 and the second electrode 14. For example, the current generator 16 may be a direct current system, an alternating current system or a stored energy current system.

In an example construction, the current generator 16 may include a first terminal 112 and a second terminal 114, the second terminal 114 having a polarity opposite of a polarity of the first terminal 112. The first electrode 14 may be electrically coupled to the first terminal 112. The second electrode 14 may be electrically coupled to the second terminal 114.

At this point, those skilled in the art will appreciate that the current generator 16 may be a commercially available resistance welding machine or a component taken from a commercially available resistance welding machine.

The first electrode 12 and the second electrode 14 may be formed from any electrically conductive material. The first electrode 12 and the second electrode 14 may be formed from a material having a thermal conductivity (e.g., either relatively high thermal conductivity or relatively low thermal conductivity) selected based upon the type weld desired, the material (e.g., aluminum or aluminum alloy) of the workpiece 24, and/or the method for welding being performed by the first electrode 12 and the second electrode 14.

For example, the first electrode 12 and/or the second electrodes 14 may be formed from copper or copper alloys (e.g., Resistance Welder Manufacturers Association ("RWMA") copper alloys Classes 1-5 or 20) when relatively high thermal conductivity is desired. Alternatively, the first electrode 12 and/or the second electrodes 14 may be formed from refractory materials, tungsten, tungsten/copper alloys or molybdenum (e.g., RWMA Classes 10-14) when relatively low thermal conductivity is desired. In general, a more conducting electrode material may be used when a steeper thermal gradient is desired between the first electrode 12 and the second electrode 14 and a less conducting electrode material may be used when a less steep temperature gradient is desired between the first electrode 12 and the second electrode 14.

The first electrode 12 and/or the second electrode 14 may be cooled. For example, the first electrode 12 may include one or more first fluid channels 30 defined therein or connected thereto. The second electrode 14 may include one or more second fluid channels 32 defined therein or connected thereto. A cooling fluid (e.g., water or ethyl glycol) may flow through the first fluid channels 30 and/or the second fluid channels 32 to remove heat from the first electrode 12 and the second electrode 14, as well as from the workpiece 24 (FIG. 2) supported by (e.g., positioned between) the first electrode 12 and the second electrode 14.

Figure 3:
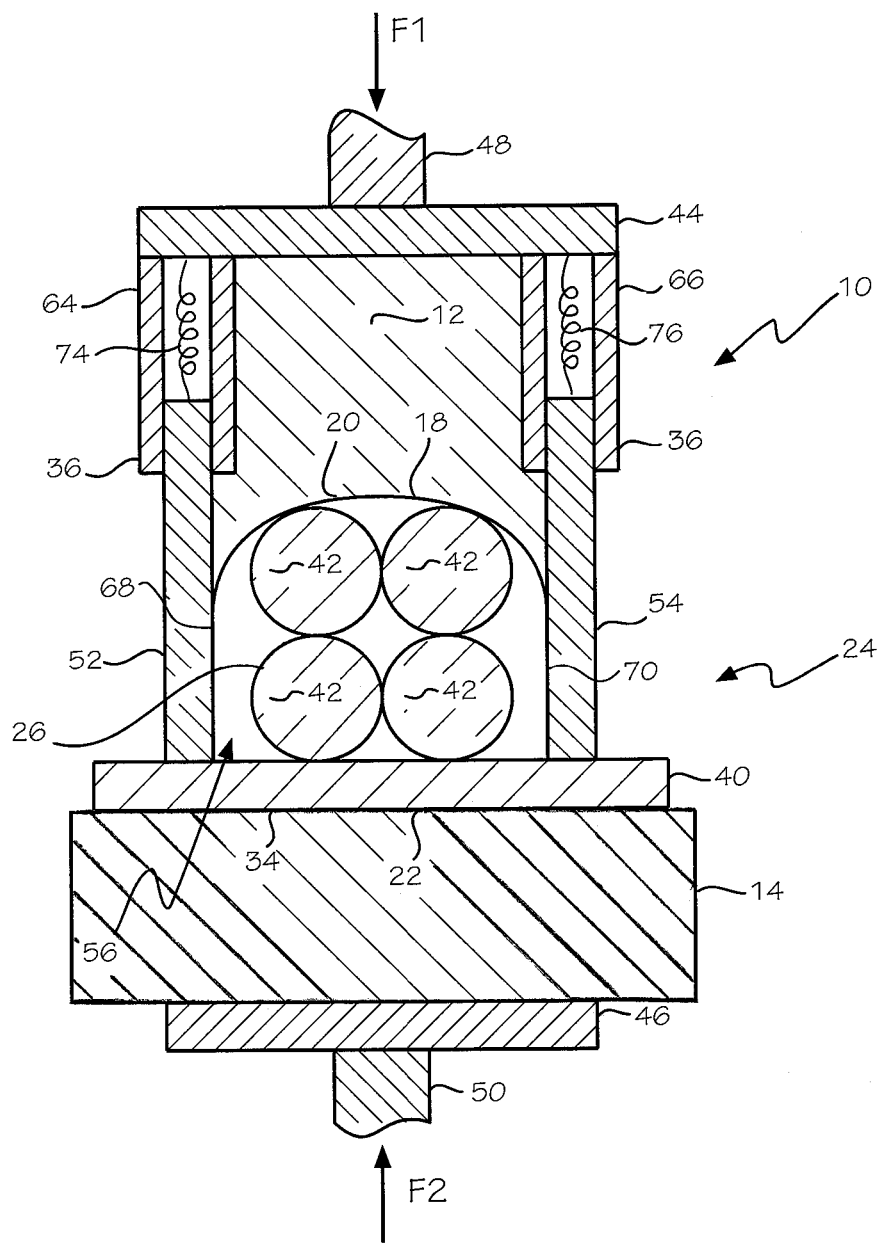
FIGS. 3, 4 and 5 are side elevational views, in section, of the workpiece being welded by the welding assembly of FIG. 2 in accordance with one implementation of the welding assembly.

Referring to FIGS. 2 and 3, in another embodiment the first electrode 12 may be mounted to a first support structure 44 and the second electrode 14 may be mounted to a second support structure 46. For example, the first support structure 44 and/or the second support structure 46 may be an arm or a tong. The first support structure 44 and the second support structure 46 may be capable of approximating the first electrode 12 and a second electrode 14 to clamp the workpiece 24 between the first electrode 12 and a second electrode 14.

In an example implementation, the first electrode 12 and the second electrode 14 may exert a clamping force (e.g., a welding force) to the workpiece 24 positioned there between. For example, the first electrode 12 and the second electrode 14 may exert a clamping force of approximately between 50 pounds and 100 pounds. In an example construction, the first support structure 44 may be moveable such that the first electrode 12 exerts a welding force $F_1$ to the workpiece 24 and the second support structure 44 may be movable such that the second electrode 14 exerts an opposing welding force $F_2$ to the workpiece 24, as illustrated in FIG. 3. As another example construction, the first support structure 44 may be a movable such that the first electrode 12 exerts a welding force $F_1$ to the workpiece 24 and the second support structure 46 may be stationary (e.g., an anvil).

In an example embodiment, the first support structure 44 may be connected to a first drive element 48 and/or the second support structure 46 may be connected to a second drive element 50. The first drive element 48 and/or the second drive element 50 may be any mechanism suitable to move (e.g., linearly translate) the first support structure 44 and/or the second support structure 44 to approximate the first electrode 12 and the second electrode 14 and exert the clamping force to the workpiece 24. For example, the first drive element 48 and/or the second drive element 50 may be a hydraulic, pneumatic, servo-drive or mechanical drive mechanism (e.g., press).

A width-determining fixture 36 may be positioned between the first electrode 12 and the second electrode 14 to define a welding volume 56 around at least a portion of the workpiece 24. The width-determining fixture 36 may at least partially enclose the workpiece 24 to prevent the flow (e.g., outward flow) of molten or hot metal 72 (FIG. 4) during resistance welding of the workpiece 24. The width-determining fixture 36 may be capable of adjusting a linear position (e.g., parallel to the direction of the clamping force) with respect to the first electrode 12 and/or the second electrode 14 to ensure sides of the welding volume 56 between the first electrode 12 and the second electrode 14 are completely enclosed. The position of the width-determining fixture 36 with respect to the workpiece 24 may define the cross-sectional thickness $T_W$ of the welded workpiece 58 (FIG. 5). The side stops (width-determining fixtures) may also be moved out sideways when not welding and moved in when welding, instead of being moved up and down. Such in-and-out movements may also occur through tapered fitting tooling.

Figure 8:
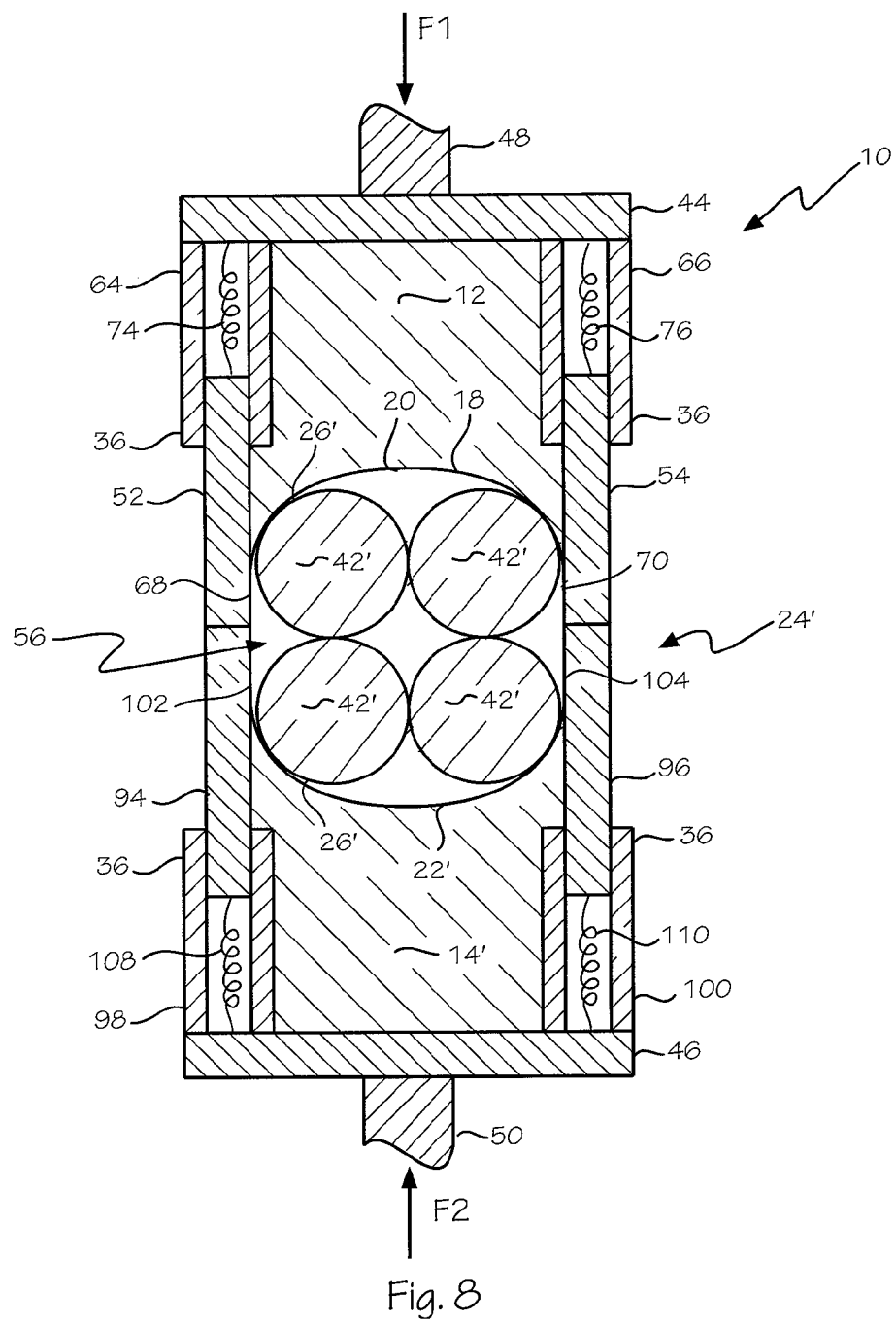
FIGS. 8, 9 and 10 are side elevational views, in section, of the workpiece being welded by another embodiment of the disclosed welding assembly.

In an example construction, the width-determining fixture 36 may be connected to or otherwise operably engaged with the first support structure 44 and/or the first drive mechanism 48 to approximate the second electrode 14 in response to the welding force $F_1$ (FIG. 3). In another example construction, width-determining fixture 36 may be connected to or otherwise operably engaged with the second support structure 46 and/or the second drive mechanism 50 to approximate the first electrode 12 in response to the welding force $F_2$ (FIG. 3), such as illustrated in FIG. 8.

Referring still to FIGS. 2 and 3, the workpiece 24 may include one or more members 38, 40 intended to be joined by resistive welding. While two members 38, 40 of the workpiece 24 are shown in FIGS. 2 and 3, those skilled in the art will appreciate that additional members may be included in the workpiece 24 without departing from the scope of the present disclosure.

The members 38, 40 of the workpiece 24 may be formed from any material capable of being joined by resistive heating. In one embodiment, the members 38, 40 of the workpiece 24 may be formed from any metals or metal alloys capable of being joined by resistive heating. For example, members 38, 40 of the workpiece 24 may be formed from aluminum or aluminum alloys.

In an example implementation, the member (e.g., a first member) 38 may include at least two strands 42. Each strand 42 may be formed from metal or metal alloy (e.g., aluminum or aluminum alloy). For example, the member 38 may be formed from a plurality of elongated strands 42 bundled together and having a generally circular cross-sectional shape. As a general, non-limiting example, the member 38 may be a metal wire, cable or rope. As a specific, non-limiting example, the member 38 may be a 25 mm$^2$, 40 mm$^2$ or 50 mm$^2$ stranded wire cable.

The member 40 (e.g., a second member) may be a terminal to which the member 38 (e.g., a stranded cable or wire) is joined by welding. For example, the member 40 may be a connector terminal suitable for connection (e.g., mechanical and/or electrical connection) to another object (e.g., an aircraft frame, a vehicle frame or an electrical junction).

In an example embodiment, the first engagement surface 18 of the first electrode 12 may be formed into an arcuate (e.g., curved) surface defining a concave recess 20 configured to make flush contact with at least a portion of the exterior surface 26 of the member 38. For example, the first engagement surface 18 may be machined as a generally semicircular shape or an inverted U shape defining a generally semicircular recess 20 configured to make flush contact with at least a portion of the exterior surface 26 (e.g., a semi-circular portion of the circumferential exterior surface) of the member 38 (e.g., a stranded cable or wire).

The second engagement surface 22 may be formed into a substantially planar surface configured to make flush contact with at least a portion of the exterior surface 34 of the member 40. For example, the second engagement surface 22 may be machined as a substantially flat shape configured to make flush contact with a substantially planar portion of the exterior surface 34 (e.g., a portion of a bottom surface) of the member 40 (e.g., a connector terminal).

Figure 4:
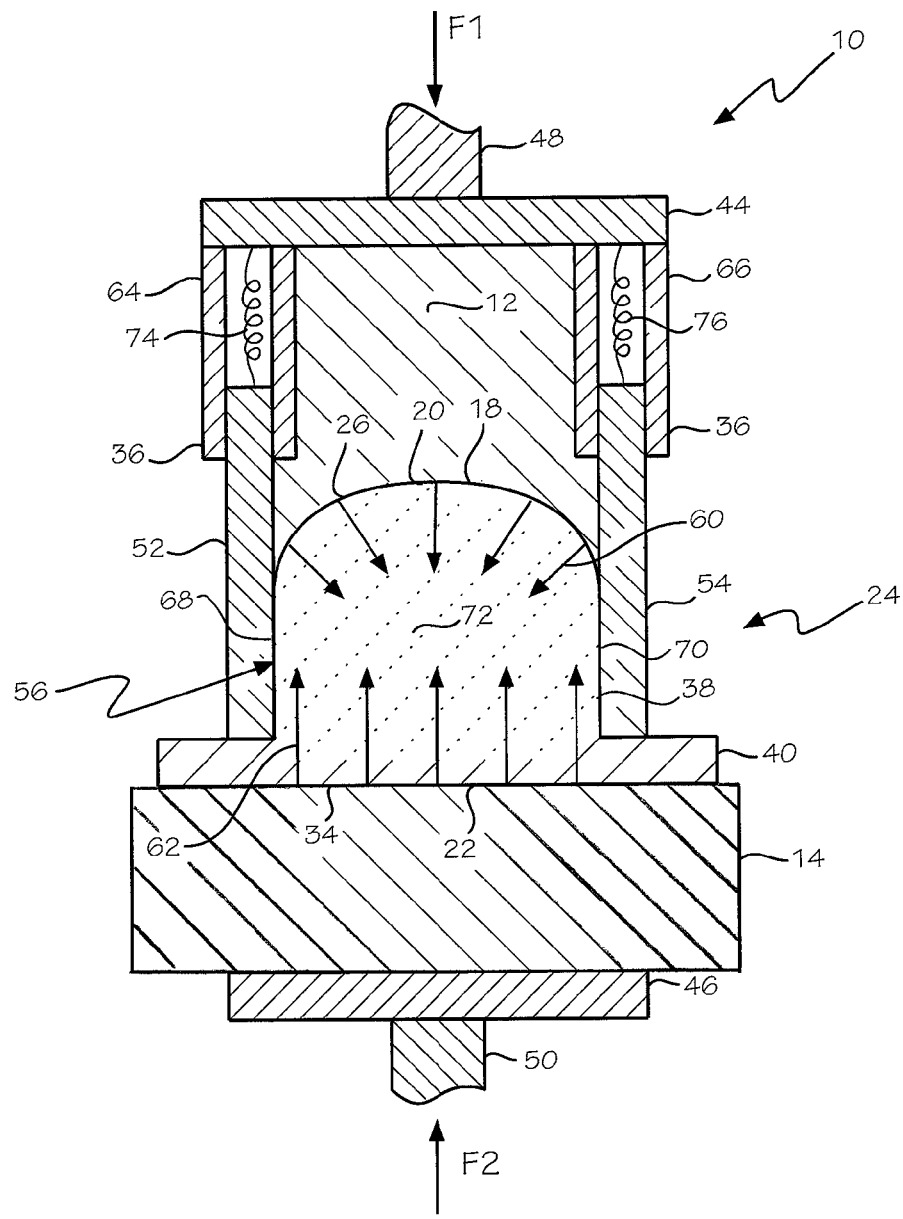
Figure 5:
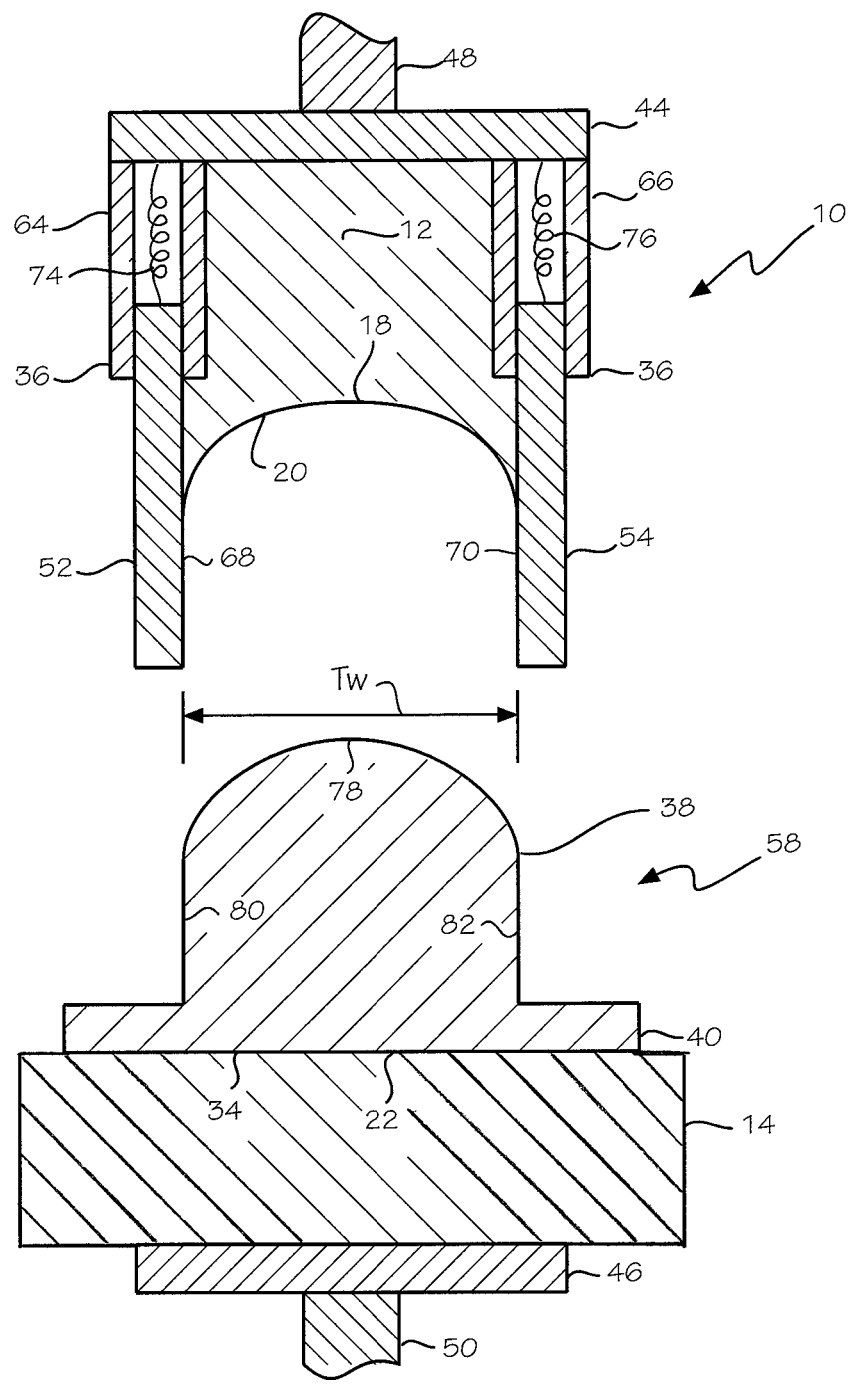

Referring to FIG. 4, the curved first engagement surface 18 of the first electrode 12 may create a larger contact surface area for electrical current to pass from the first electrode 12 to the member 38 (e.g., to the plurality of strands 42) as compared to a planar engagement surface. This larger surface area may decrease the current density at a surface of the workpiece 24 (e.g., between the curved contact surfaces 18 and 26 of the first electrode 12 and the member 38) and increase the current density proximate a center of the workpiece 24. For example, the curved first engagement surface 18 may direct (e.g., focus) the current from the first electrode 12 toward the center of the member 38, as illustrated by directional arrows 60.

The current density at an opposing surface of the workpiece 24 (e.g., between planar contact surfaces 22 and 34 of the second electrode 14 and the member 40) may be higher or lower. For example, the planar second engagement surface 20 may direct the current from the second electrode 14 through the member 40 and through the member 38, as illustrated by directional arrows 62.

Thus, when a voltage is applied between the first electrode 12 and the second electrode 14 (e.g., from the current generator 16), a current flows between the first engagement surface 18 and the second engagement surface 22 through the core of the workpiece 24 along the path indicated by arrows 60 and 62. By decreasing the current density at the exterior surface 26 of the member 38 (e.g., at the exterior surfaces of the strands 42) and increasing the current density toward the center of the member 38, the heat generated proximate (e.g., at or near) the center of the member 38 may become greater than the heat generated at any location on the exterior surface 26 of the member 38 tending to more consistently melt the plurality of strands 42 throughout the member 38.

Those skilled in the art will appreciate that the first engagement surface 18 and the recess 20 may be provided in various sizes (e.g., length and width), shapes (e.g., curve radius) and configurations, for example, depending upon the diameter of the member 38, the number of strands 42 and the length of the member 38 (e.g., length of a portion of the plurality of strands 42) that is to be welded (e.g., solidified).

Referring to FIGS. 3 and 4, in an example construction, the width-determining fixture 36 may be positioned adjacent to the first electrode 12. In an example embodiment, the width-adjusting fixture 36 may include a first (e.g., left) side stop 52 and a second (e.g., right) side stop 54. The first side stop 52 may be positioned adjacent to (e.g., to the left of) the first electrode 12 and the second side stop 54 may be positioned adjacent to (e.g., to the right of) the first electrode 12 such that the first side stop 52 and the second side stop 54 are positioned to the sides (e.g., the left side and the right side) of the member 38 when the clamping force is exerted to the workpiece 24.

The first side stop 52 and the second side stop 54 may formed from a material having an electrical resistance greater than that of the first electrode 12 and the second electrode 14. For example, the first side stop 52 and the second side stop 54 may be formed from a high resistance metal. As another example, the first side stop 52 and the second side stop 54 may be formed from an electrically insulating or non-conductive material, such as ceramic. In general, the material of the first side stop 52 and the second side stop 54 may be selected to ensure the electrical current is directed through the workpiece 24, such as indicated by directional arrows 60 and 62 (FIG. 4).

In an example embodiment, the first side stop 52 may be housed within a first sleeve 64 and the second side stop 54 may be housed within a second sleeve 66. The first sleeve 64 and the second sleeve 66 may be connected to the first support structure 44 such that the first side stop 52 and the second side stop 54 define the welding volume 56 around (e.g., to the sides of) the member 38 as the first electrode 12 approximates the second electrode 14 in response to the welding force $F_1$ (FIG. 3). When the first electrode 12 approaches the second electrode 14 and exerts the clamping force to the member 38 therebetween, the first side stop 52 and the second side stop 54 may engage the member 40 (e.g., connector terminal) adjacent to the member 38 (e.g., stranded cable). As such, the welding volume 56 may be defined by the first engagement surface 22 of the first electrode 12, an interior surface 68 of the first side stop 52, an interior surface 70 of the second side stop 54 and a portion of the exterior surface 34 (e.g., a top surface) of the member 40 positioned between the first side stop 52 and the second side stop 54.

The position of the first side stop 52 and the second side stop 54 with respect to the first sleeve 64 and the second sleeve 66, respectively, may automatically adjust a linear position (e.g., parallel to the direction of the welding force $F_1$) to constantly engage the exterior surface 34 of the member 40 and contain the flow of molten metal 72 within the welding volume 56, as illustrated in FIG. 4. For example, the first side stop 52 may be outwardly biased from within the first sleeve 64 and the second side stop 54 may be outwardly biased from within the second sleeve 66. In an example construction, the first side stop 52 may be connected within the first sleeve 64 by a first biasing element 74 (e.g., a spring) and the second side stop 54 may be connected within the second sleeve 66 by a second biasing element 76 (e.g., a spring). A bottom surface 84 (FIG. 2) of the first side stop 52 and the second side stop 54 may be substantially planar to make flush contact with the substantially planar exterior surface 34 of the member 40.

In an example implementation, as the first support structure 48 approximates the second support structure 46 (e.g., via the first drive element 48), the first electrode 12 may move toward and exert welding force $F_1$ (e.g., clamping force) upon the member 38 and the first side stop 52 and the second side stop 54 may simultaneously move toward and engage the member 40. As the first support structure 48 further approximates the second support structure 46, the welding force $F_1$ exerted to the member 38 by the first electrode 12 and the second electrode 14 may increase as the first electrode 12 approximates the second electrode 14; however, the first side stop 52 and the second side stop 54 may be at least partially pushed into the first sleeve 64 and the second sleeve 66, respectively, to prevent damage to the member 40 while maintaining flush contact with the member 40 and containing the outward flow of the molten metal 72 (FIG. 4).

Referring to FIG. 5, the welded workpiece 58 may have a shape substantially matching the shape of the welding volume 56. For example, welded workpiece 58 may include a curved upper end 78 substantially matching the curved first engagement surface 18 of the first electrode 12, a planar first (e.g., left) side 80 substantially matching the planar first interior surface 68 of the first side stop 52 and a planar second (e.g., right) side 82 substantially matching the planar second interior surface 70 of the second side stop 54. In an example implementation, the welded workpiece 58 may include a solidified portion of the plurality of strands 42 of the member 38 (e.g., a stranded cable) joined to the member 40 (e.g., a connector terminal) through resistive welding.

Figure 6:
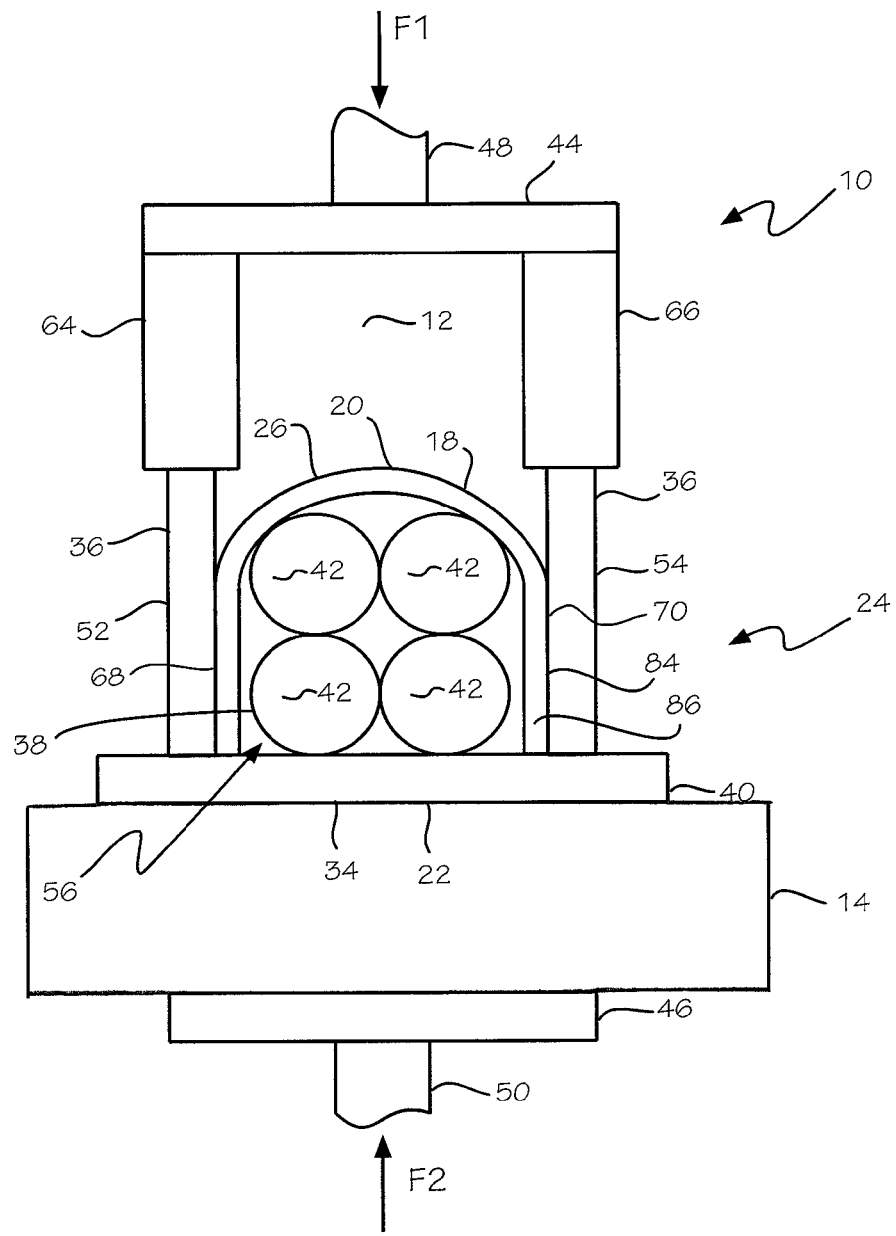
FIG. 6 is a side elevational view of the workpiece being welded by the welding assembly of FIG. 2 in accordance with another implementation of the disclosed welding assembly.
Figure 7:
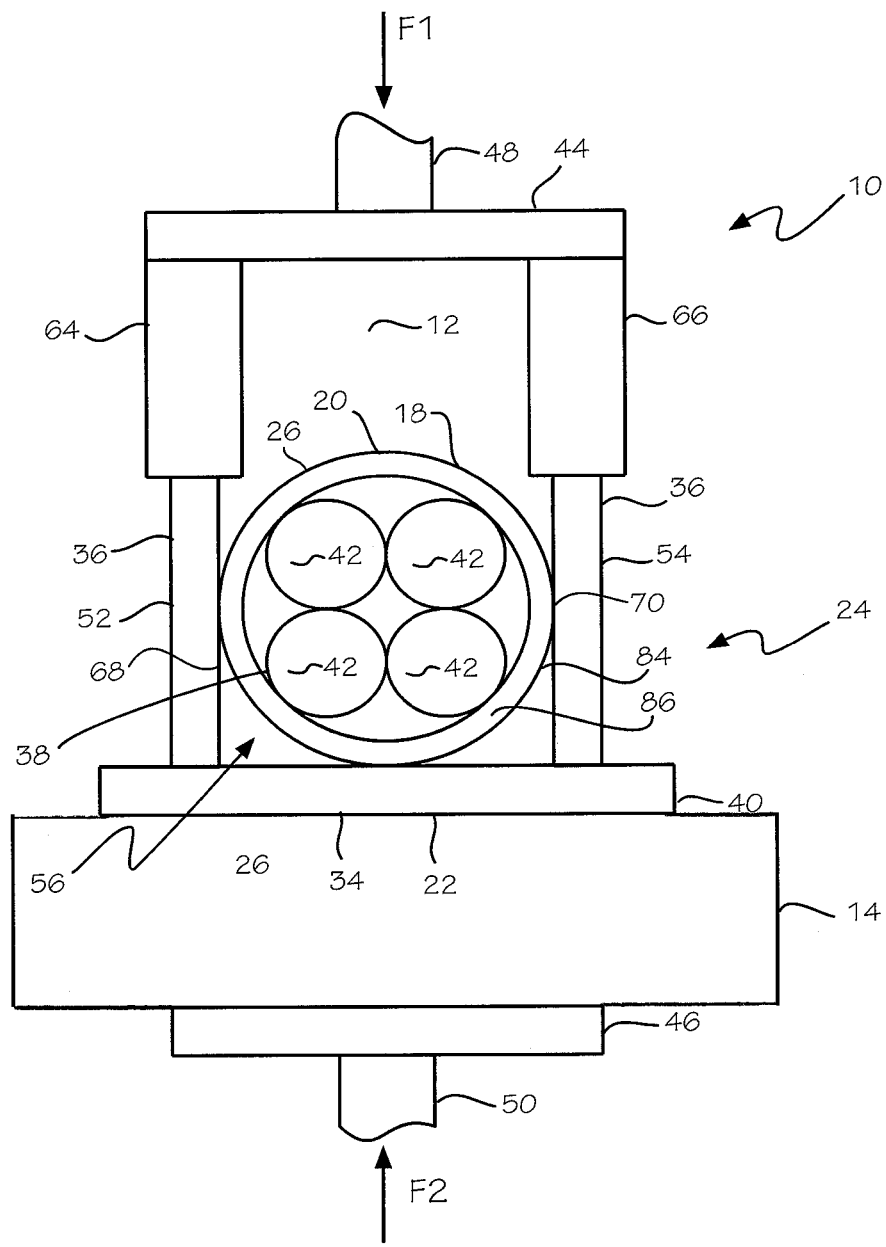
FIG. 7 is a side elevational view of the workpiece being welded by the welding assembly of FIG. 2 in accordance with another implementation of the disclosed welding assembly.

Referring to FIGS. 6 and 7, in one particular implementation, the workpiece 24 may also include an auxiliary member 84. The auxiliary member 84 may have a size and shape sufficient to at least partially surround the workpiece 24. The auxiliary member 84 may be formed from a material having the same or similar chemistry as the members 38, 40, or from a material that is compatible with the material from which the members 38, 40 are formed. For example, when the members 38, 40 are formed from aluminum alloys, the auxiliary member 84 may be formed from an aluminum alloy or appropriate aluminum alloy filler metal.

As illustrated in FIG. 6, in one example, the auxiliary member 84 may be a generally semi-circular band 86 having an arcuate (e.g. curved) body (e.g., U-shaped) of sufficient size and shape to at least partially surround (e.g., cover) the exterior surface 26 of the member 38 (e.g., a stranded cable) and ends that extend to engage the exterior surface 34 of the member 40 (e.g., a connector terminal).

As illustrated in FIG. 7, in another example, the auxiliary member 84 may be a generally circular band 88 having a continuous body of sufficient size and shape to completely surround (e.g., cover) the exterior surface 26 of the member 38 (e.g., a stranded cable).

The curved first engagement surface 18 of the first electrode 12 may include a sufficient shaped and size to contact at least a portion of an exterior surface 26 the auxiliary member 84 and focus electrical current toward the center of the workpiece 24 (e.g., the member 38) in a similar manner as described above and illustrated in FIG. 4.

The material of the auxiliary member 84 may melt during resistance welding and combine with the molten metal 72 (FIG. 4) within the welding volume 56 to further solidify the plurality of strands 42 of the member 38 into a solid welded workpiece 58, such as illustrated in FIG. 5. The first side stop 52 and the second side stop 54 may be positioned adjacent to (e.g., to the sides of) the auxiliary member 84 when the first electrode 12 exerts welding force $F_1$ upon the workpiece 24.

Referring to FIG. 8, in another embodiment, the workpiece 24' may include a member 38' intended to be solidified by resistive welding. In an example implementation, the member 38' may include a plurality of strands 42'. Each strand 42' may be formed from metal or metal alloy (e.g., aluminum or aluminum alloy). For example, the member 38' may be formed from a plurality of elongated strands 42' bundled together and having a generally circular cross-sectional shape. As a general, non-limiting example, the member 38' may be a metal wire, cable or rope. As a specific, non-limiting example, the member 38' may be a 25 mm$^2$, 40 mm$^2$ or 50 mm$^2$ stranded wire cable.

While four strands 42' of the member 38' of the workpiece 24 are shown in FIGS. 8, 9, 10 and 11, those skilled in the art will appreciate that additional strands 42' of the member 38' may be included in the workpiece 24' without departing from the scope of the present disclosure.

The second engagement surface 22' of the second electrode 14' may be formed into an arcuate (e.g. curved) surface defining a concave recess 28. For example, the second engagement surface 22' may be machined as a generally semicircular shape defining a generally semicircular recess 28. The first engagement surface 18 and the second engagement surface 22' may include size and shape suitable to engage (e.g., contact) at least a portion of an exterior surface 26' of the workpiece 24' (e.g., an exterior surface of the plurality of strands 42' of the member 38'). For example, the first engagement surface 18 of the first electrode 12 and the second engagement surface 22' of the second electrode 14' may be configured to solidify the plurality of metal strands 42' of the member 38' (e.g., a stranded cable).

Figure 9:
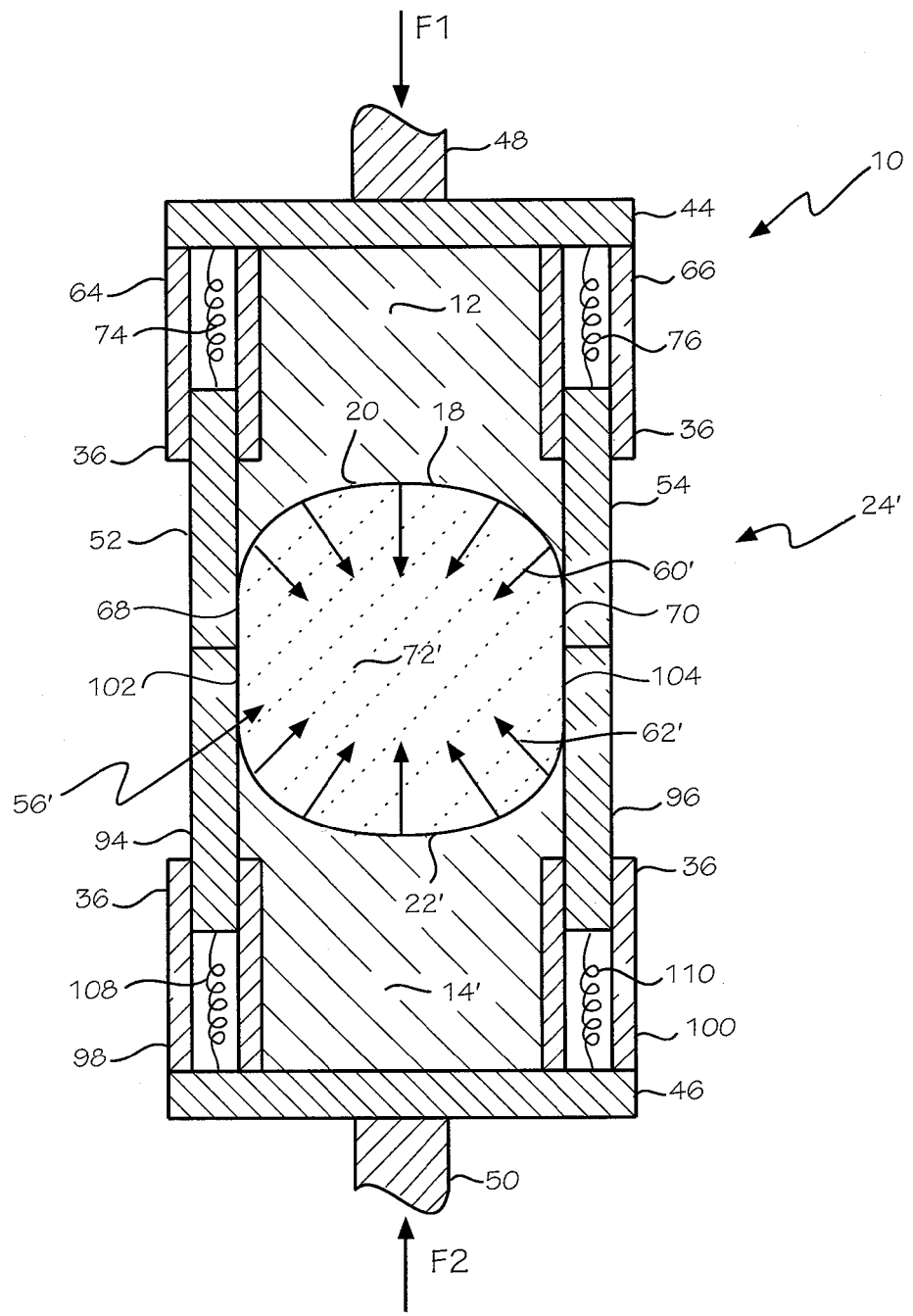

Referring to FIG. 9, the curved first engagement surface 18 of the first electrode 12 and the curved second engagement surface 22' of the second electrode 14' may create a larger contact surface area for electrical current to pass from the first electrode 12 and the second electrode 14' to the member 38' as compared to a planar engagement surface. This larger surface area may decrease the current density at a surface of the workpiece 24' (e.g., between the curved contact surfaces 18, 22' and 26' of the first electrode 12 and the second electrode 14' and the member 38', respectively) and increase the current density at the center of the workpiece 24'. For example, the curved first engagement surface 18 and the curved second engagement surface 22' may direct (e.g., focus) the current from the first electrode 12 and the second electrode 14' toward the center of the member 38', as illustrated by directional arrows 60' and 62'.

The width-determining fixture 36 may be positioned adjacent to the first electrode 12 and the second electrode 14'. In an example embodiment, the width-adjusting fixture 36 may include a first (e.g., left) side stop 52 and an opposing second (e.g., right) side stop 54 adjacent the first electrode 12 and a third (e.g., left) side stop 94 and an opposing fourth (e.g., right) side stop 96 adjacent the second electrode 14'. The first side stop 52, the second side stop 54, the third side stop 94 and the fourth side stop 96 may be positioned to the sides (e.g., the left side and the right side) of the member 38' to at least partially define the welding volume 56' around (e.g., to the sides of) the member 38' as the first electrode 12 approximates the second electrode 14' in response to the welding force $F_1$ and/or $F_2$.

The third side stop 94 may be housed within a third sleeve 98 and the fourth side stop 96 may be housed within a fourth sleeve 102. The third sleeve 98 and the fourth sleeve 100 may be connected to the second support structure 44. When the first electrode 12 approximates the second electrode 14' and exert a clamping force to the member 38' therebetween, the first side stop 52 may engage (e.g., contact) the third side stop 98 and the second side stop 54 may engage the fourth side stop 100. As such, the welding volume 56' may be defined by the first engagement surface 22 of the first electrode 12, the interior surface 68 of the first side stop 52, an interior surface 102 of the third side stop 98, the interior surface 70 of the second side stop 54, the interior surface 104 of the fourth side stop 100 and the second engagement surface 22' of the second electrode 14'.

The position of the first side stop 52 and the third side stop 94 with respect to the first sleeve 64 and the third sleeve 98, respectively, may automatically adjust position a linear position (e.g., parallel to the direction of the welding force $F_1$ and $F_2$) to constantly engage each other and contain the flow of molten metal 72' within the welding volume 56', as illustrated in FIG. 9. Similarly, the position of the second side stop 54 and the fourth side stop 96 may automatically adjust a linear position with respect to the second sleeve 66 and the fourth sleeve 100, respectively, to constantly engage each other and contain the flow of molten metal 72' within the welding volume 56'.

For example, the third side stop 94 may be outwardly biased from within the third sleeve 98 and the fourth side stop 96 may be outwardly biased from within the fourth sleeve 100. In an example construction, the third side stop 94 may be connected within the third sleeve 98 by a third biasing element 108 (e.g., a spring) and the fourth side stop 96 may be connected within the fourth sleeve 100 by a fourth biasing element 110 (e.g., a spring). Engaging surfaces of the first side stop 52 and the third side stop 94 may be substantially planar to make flush contact with each other and engaging surfaces the second side stop 54 and the fourth side stop 96 may be substantially planar to make flush contact with each other.

Figure 10:
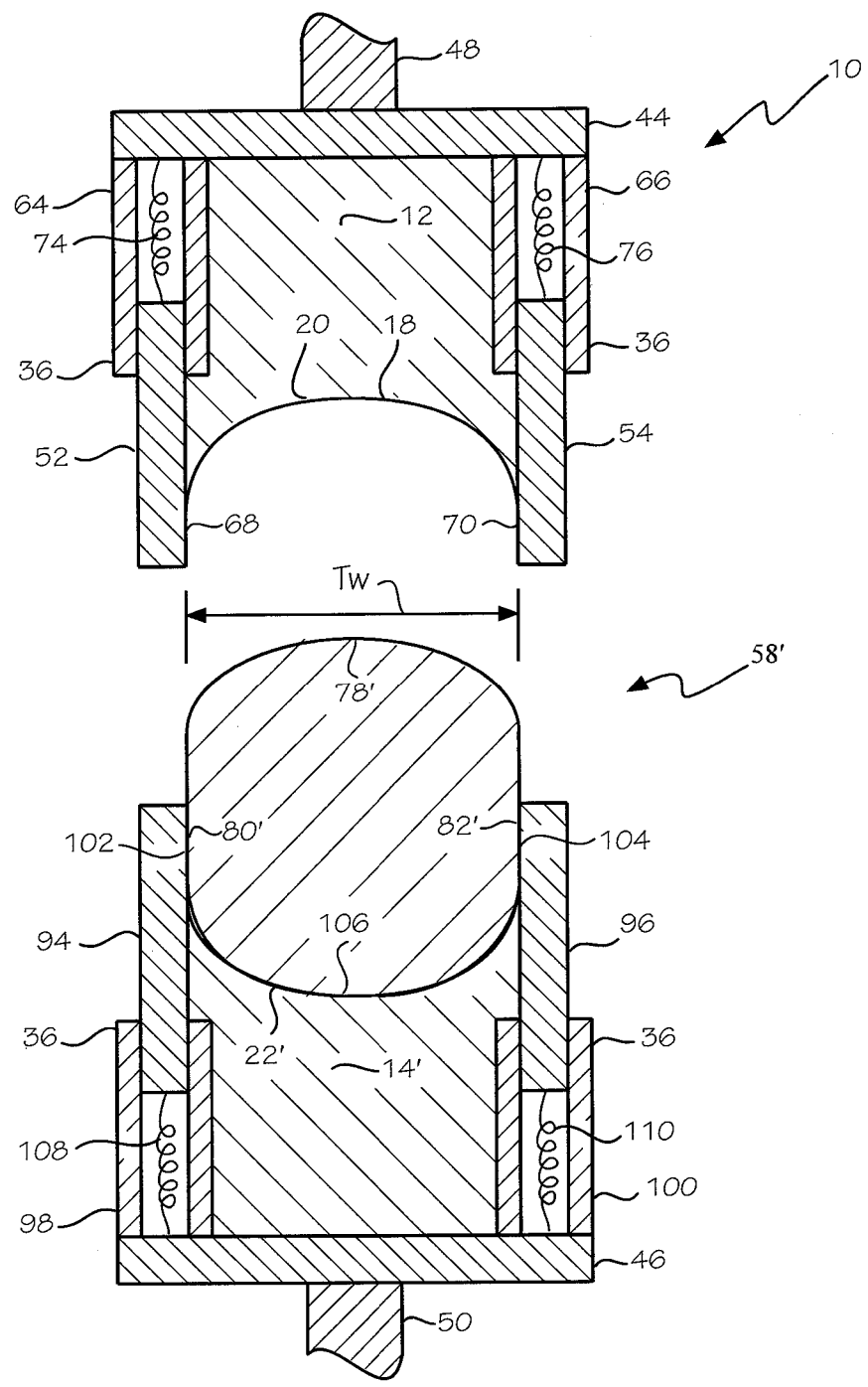

Referring to FIG. 10, the welded workpiece 58' may have a shape substantially matching the shape of the welding volume 56'. For example, welded workpiece 58' may include a curved upper end 78' substantially matching the curved first engagement surface 18 of the first electrode 12, a planar first (e.g., left) side 80' substantially matching the planar interior surface 68 of the first side stop 52 and the interior surface 102 of the third side stop 94, a planar second (e.g., right) side 82' substantially matching the planar interior surface 70 of the second side stop 54 and interior surface 104 of the fourth side stop 96 and a curved lower end 106 substantially matching the curved second engagement surface 22' of the second electrode 14'. For example, the welded workpiece 58' may include a solidified portion of the plurality of strands 42' of the member 38' (e.g., a stranded cable).

Figure 11:
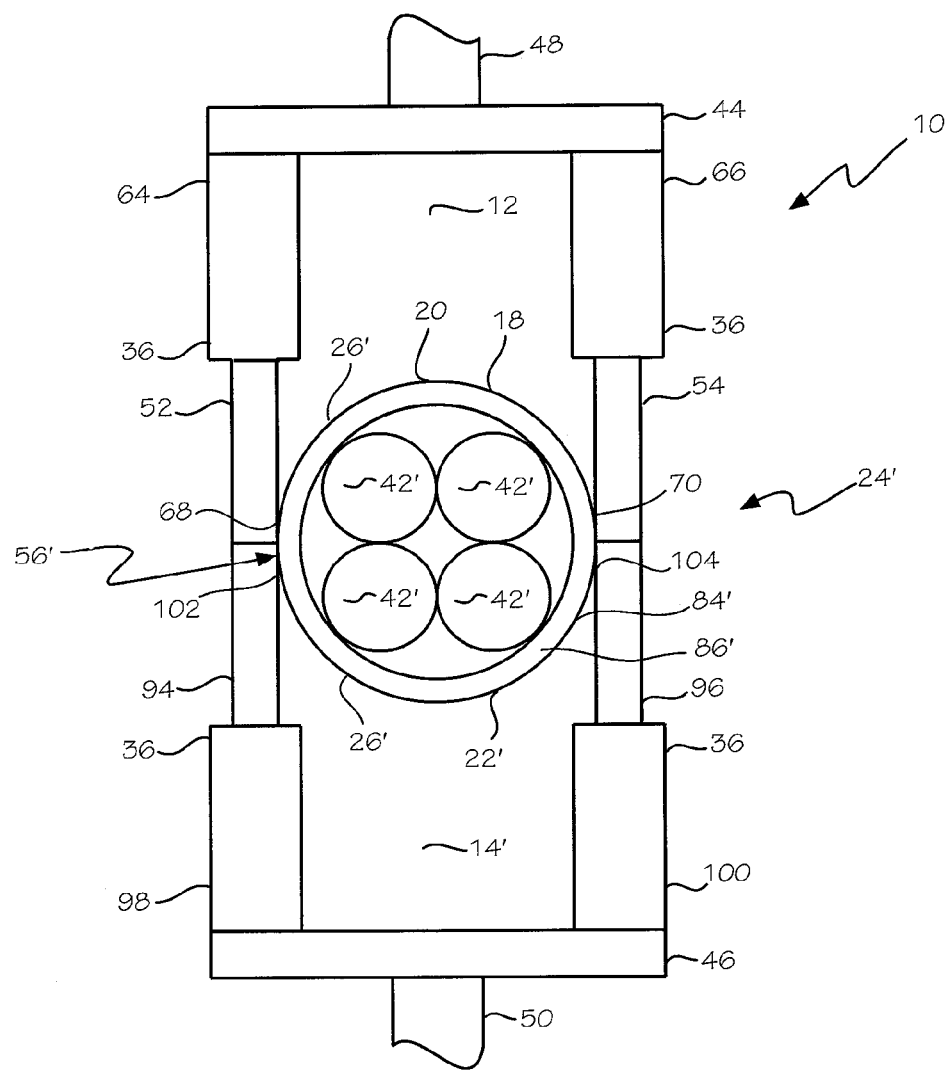
FIG. 11 is a side elevational view of the workpiece being welded by the welding assembly of FIG. 8 in accordance with another implementation of the disclosed welding assembly.

Referring to FIG. 11, in one particular implementation, the workpiece 24' may also include an auxiliary member 84'. The auxiliary member 84' may have a size and shape sufficient to at least partially surround the workpiece 24'. For example, the auxiliary member 84' may be a generally circular band 88' having a continuous body of sufficient size and shape to completely surround (e.g., cover) the exterior surface 26' of the member 38' (e.g., a stranded cable)

For example, the curved first engagement surface 18 of the first electrode 12 may contact at least a portion (e.g., an upper portion) of the exterior surface 26' of the auxiliary member 84' and the curved second engagement surface 22' of the second electrode 14' may contact at least a portion (e.g., a lower portion) of the exterior surface 26' of the auxiliary member 84' to focus electrical current toward the center of the workpiece 24' in a similar manner as described above and illustrated in FIG. 9.

Figure 12:
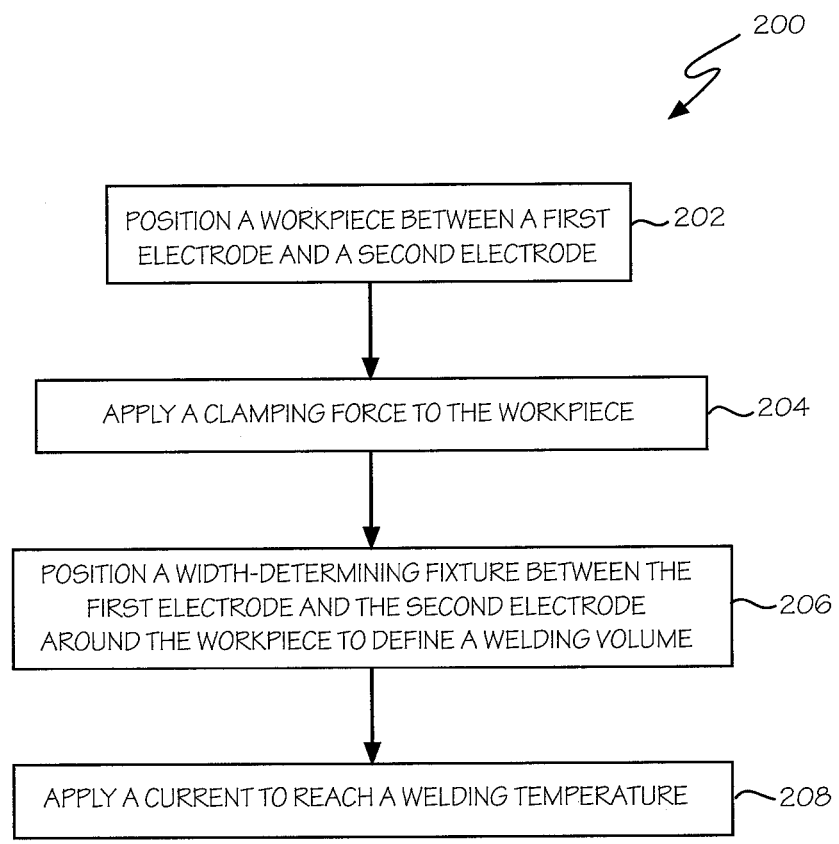
FIG. 12 is one embodiment of the disclosed method for welding metal and metal alloy stranded cable.

Referring to FIG. 12, one embodiment of the disclosed method, generally designated 200, for welding stranded metal and metal alloys (e.g., stranded cables of wires) may begin by positioning a workpiece 24 (e.g., member 38 and member 40) between a first electrode 12 and a second electrode 14 of a welding assembly 10, as shown at block 202 and best illustrated in FIG. 2.

In a first, alternate implementation, an auxiliary member 84 may be included to the workpiece 24. For example, the auxiliary member may be positioned at least partially around the workpiece 24 (e.g., member 38), as illustrated in FIGS. 6 and 7.

In a second, alternate embodiment, a workpiece 24' (e.g., member 38') may be positioned between a first electrode 12 and a second electrode 14' of a welding assembly 10, as best illustrated in FIG. 8.

In a second, alternate implementation, an auxiliary member 84' may be included to the workpiece 24'. For example, the auxiliary member 84' may be positioned at least partially around the workpiece 24' (e.g., the member 38').

As shown at block 204, the first electrode 12 and the second electrode 14 may apply a clamping force (e.g., welding force $F_1$ and/or $F_2$) to the workpiece 24, as best illustrated in FIG. 3.

In the second, alternate embodiment, the first electrode 12 and the second electrode 14' may apply a clamping force (e.g., welding force $F_1$ and/or $F_2$) to the workpiece 24', as best illustrated in FIG. 8.

As shown at block 206, a width-determining fixture 36 may be positioned between the first electrode 12 and the second electrode 14 around the workpiece 24 to define a welding volume 56.

In the second, alternate embodiment, a width-determining fixture 36 may be positioned between the first electrode 12 and the second electrode 14' around the workpiece 24' to define a welding volume 56'.

As shown at block 208, the current generator 16 (FIG. 1) may be actuated to pass a welding current through the workpiece 24 (e.g., members 38 and 40) for a sufficient amount of time to raise the temperature of the workpiece 24 to a welding temperature to liquefy the plurality of strands 42 of the member 38 within the welding volume 56 and join the liquefied member 38 to the member 40 and form a solid welded workpiece 58, as illustrated in FIGS. 4 and 5.

In the first, alternate implementation, the current generator 16 may be actuated to pass a welding current through the workpiece 24 (e.g., members 38 and 40 and auxiliary member 84) for a sufficient amount of time to raise the temperature of the workpiece 24 to a welding temperature to liquefy the plurality of strands 42 of the member 38 and the auxiliary member 84 within the welding volume 56 and join the liquefied member 38 and auxiliary member 84 to the member 40 and form a solid welded workpiece 58.

In another embodiment, the current generator 16 (FIG. 1) may be actuated to pass a welding current through the workpiece 24' (e.g., member 38') for a sufficient amount of time to raise the temperature of the workpiece 24' to a welding temperature to liquefy the plurality of strands 42' of the member 38' within the welding volume 56' and form a solid welded workpiece 58', as illustrated in FIGS. 9 and 10.

In the second, alternate implementation, the current generator 16 may be actuated to pass a welding current through the workpiece 24' (e.g., member 38' and auxiliary member 84') for a sufficient amount of time to raise the temperature of the workpiece 24' to a welding temperature to liquefy the plurality of strands 42' of the member 38' and the auxiliary member 84' within the welding volume 56' and form a solid welded workpiece 58'.

Optionally, the welding current may be pulsed, which may be a more precise way of achieving and maintaining the welding temperature. Those skilled in the art will appreciate that the welding temperature will depend on the material being welded, any surface coatings, as well as the nature of the bond desired. For example, when the workpiece 24 is formed from an aluminum alloy, the welding temperature may be at least half of the solidus temperature of the aluminum alloy in degrees Kelvin. If multiple alloys are used having a range of solidus temperatures, the welding temperature may be at least half of the lowest solidus temperature in degrees Kelvin.

The welding current may be maintained for a sufficient time to liquefy the member 38 (e.g., the plurality of strands 42) and at least a portion of the member 40 into molten metal 72. For example, as shown in FIG. 4, due to the specific current path (e.g., in the direction of arrows 60 and 62) resulting from use of the curved first engagement surface 18 and planar second engagement surface 22, the welding current may be focused toward the center region of the member 38 and maintained for a sufficient time to yield a solid-state weld in the welded workpiece 58, as illustrated in FIG. 5.

In the first, alternate implementation, the welding current may be maintained for a sufficient time to liquefy the member 38 (e.g., the plurality of strands 42), the auxiliary member 84 and at least a portion of the member 40 into molten metal 72.

In another embodiment, welding current may be maintained for a sufficient time to liquefy the member 38' (e.g., the plurality of strands 42') into molten metal 72'. For example, as shown in FIG. 9, due to the specific current path (e.g., in the direction of arrows 60' and 62') resulting from use of the curved first engagement surface 18 and curved second engagement surface 22', the welding current may be focused toward the center region of the member 38' and maintained for a sufficient time to yield a solid welded workpiece 58, as illustrated in FIG. 10.

In the second, alternate implementation, welding current may be maintained for a sufficient time to liquefy the member 38' (e.g., the plurality of strands 42') and the auxiliary member 84' into molten metal 72'.

Optionally, a cooling step may be introduced between the various steps of the method 200 or combined with the various steps of the method 200. In an example implementation, the welded workpiece 58 (FIG. 5) may be cooled by circulating cooling fluid through the fluid channels 30, 32 (FIG. 1) in the first and second electrodes 12, 14 while one or more of the first and second electrodes 12, 14 are engaged with the welded workpiece 58. In another implementation, the welded workpiece 58 may be air cooled by removing the welded workpiece 58 from engagement with one or both of the first and second electrodes 12, 14.

While the method 200 is described herein with reference to the disclosed welding assembly 10, those skilled in the art will appreciate that the disclosed method 200 may be performed using any appropriate welding assembly.

Although various embodiments of the disclosed welding assembly and method have been shown and described, modifications may occur to those skilled in the art upon reading the specification. The present application includes such modifications and is limited only by the scope of the claims.

What is claimed is:

1. A method for welding stranded metals and metal alloys using a current generator, said method comprising: assembling a workpiece comprising a first member, said first member comprising a plurality of strands; positioning said workpiece between a first electrode and a second electrode, said second electrode being aligned with said first electrode along a longitudinal axis, wherein said first electrode and said second electrode are electrically coupled to said current generator; applying a clamping force to said workpiece; positioning a width-determining fixture between said first electrode and said second electrode around said workpiece to define a welding volume having a width, said width determining fixture comprising a first side stop laterally opposed from a second side stop, wherein said first side stop is positioned on a first side of said workpiece and said second side stop is positioned on a second side of said workpiece; and applying a current through said workpiece to heat said workpiece, wherein said first side stop and said second side stop contain hot or molten metal within said width while said current is applied such that a width of said workpiece does not increase beyond said width of said welding volume, and wherein said hot or molten metal is contained within said width of said welding volume without inhibiting relative movement of said first electrode and said second electrode along said longitudinal axis.

2. The method of claim 1 wherein said first electrode comprises a first engagement surface, said first engagement surface being curved to define a recess.

3. The method of claim 1 wherein said workpiece further comprises a second member, and wherein said first electrode is positioned proximate said first member and said second electrode is positioned proximate said second member.

4. The method of claim 1 wherein said workpiece further comprises an auxiliary member.

5. The method of claim 1 wherein a linear position of said width-determining fixture with respect to said first electrode is adjustable in a direction parallel to said clamping force.

6. The method of claim 2 wherein said second electrode comprises a second engagement surface, said second engagement surface being curved to define a recess.

7. The method of claim 3 wherein said first member and said second member comprise aluminum or an aluminum alloy.

8. The method of claim 4 wherein said auxiliary member is positioned at least partially around said plurality of strands of said first member.

9. A method for welding stranded metals and metal alloys comprising: providing a current generator; assembling a workpiece comprising a first member and an auxiliary member, said first member comprising a plurality of strands, wherein said auxiliary member extends partially, but not completely, around said plurality of strands of said first member, positioning a first electrode proximate said workpiece, said first electrode being electrically coupled to said current generator; positioning a second electrode proximate said workpiece, said second electrode being electrically coupled to said current generator, wherein said second electrode is aligned with said first electrode along a longitudinal axis; applying a clamping force to said workpiece; positioning a width-determining fixture between said first electrode and said second electrode around said workpiece to define a welding volume having a width, said width determining fixture comprising a first side stop laterally opposed from a second side stop, wherein said first side stop is positioned on a first side of said workpiece and said second side stop is positioned on a second side of said workpiece;

and applying a current through said workpiece to heat said workpiece, wherein said first side stop and said second side stop contain hot or molten metal within said width while said current is applied such that a width of said workpiece does not increase beyond said width of said welding volume, and wherein said hot or molten metal is contained within said width of said welding volume without inhibiting relative movement of said first electrode and said second electrode along said longitudinal axis.

10. The method of claim 9 wherein said first electrode comprises a first engagement surface, said first engagement surface being curved to define a recess.

11. The method of claim 9 wherein said workpiece further comprises a second member, and wherein said first electrode is positioned proximate said first member and said second electrode is positioned proximate said second member.

12. The method of claim 9 wherein a linear position of said width-determining fixture with respect to said first electrode is adjustable in a direction parallel to said clamping force.

13. The method of claim 10 wherein said second electrode comprises a second engagement surface, said second engagement surface being curved to define a recess.

14. The method of claim 11 wherein said first member and said second member comprise aluminum or an aluminum alloy.

15. A method for welding stranded metals and metal alloys comprising: providing a current generator; assembling a workpiece comprising a first member, said first member comprising a plurality of strands; positioning a first electrode proximate said workpiece, said first electrode being electrically coupled to said current generator; positioning a second electrode proximate said workpiece, said second electrode being electrically coupled to said current generator, wherein said second electrode is aligned with said first electrode along a longitudinal axis; positioning a width-determining fixture between said first electrode and said second electrode around said workpiece to define a welding volume having a width, said width determining fixture comprising a first side stop laterally opposed from a second side stop, wherein said first side stop is positioned on a first side of said workpiece and said second side stop is positioned on a second side of said workpiece, wherein said first side stop and said second side stop contain hot or molten metal within said width while said current is applied such that a width of said workpiece does not increase beyond said width of said welding volume, and wherein said hot or molten metal is contained within said width of said welding volume without inhibiting relative movement of said first electrode and said second electrode along said longitudinal axis; applying a current through said workpiece to heat said workpiece; and applying a clamping force to said workpiece during said step of applying said current, wherein said clamping force causes said first electrode to move relative to said width-determining fixture and approximate said second electrode.

16. The method of claim 15 wherein said first side stop is partially received in, but biased out of, a first sleeve and said second side stop is partially received in, but biased out of, a second sleeve.

* * * * *